(12) United States Patent
Vajravel

(10) Patent No.: US 9,760,730 B2
(45) Date of Patent: Sep. 12, 2017

(54) SYSTEM AND METHOD TO REDIRECT AND UNLOCK SOFTWARE SECURE DISK DEVICES IN A HIGH LATENCY ENVIRONMENT

(71) Applicant: Dell Products L.P., Round Rock, TX (US)

(72) Inventor: Gokul T. Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 14/839,375

(22) Filed: Aug. 28, 2015

(65) Prior Publication Data

US 2017/0061145 A1 Mar. 2, 2017

(51) Int. Cl.
H04L 29/06 (2006.01)
G06F 21/62 (2013.01)
G06F 12/14 (2006.01)
G06F 9/50 (2006.01)
G06F 9/44 (2006.01)

(52) U.S. Cl.
CPC ........ *G06F 21/6218* (2013.01); *G06F 9/4411* (2013.01); *G06F 9/5077* (2013.01); *G06F 12/1408* (2013.01); *H04L 63/0281* (2013.01); *H04L 63/0428* (2013.01)

(58) Field of Classification Search
CPC ............. G06F 21/6218; G06F 12/1408; G06F 9/5077; G06F 9/455; G06F 9/4411; H04L 63/0281; H04L 63/0428
See application file for complete search history.

(56) References Cited

U.S. PATENT DOCUMENTS 6,298,401 B1 * 10/2001 Anderson ............. G06F 3/0607
707/999.103
6,321,358 B1 * 11/2001 Anderson ................ G11B 5/64
714/763
6,529,949 B1 3/2003 Getsin
(Continued)

OTHER PUBLICATIONS

Universal Serial Bus Mass storage, Bulk Only Transport specification—Revision 1.0, Sep. 31, 1999, USB.org, www.usb.org/developers/docs/devclass_docs/usbmassbulk_10.pdf, 22 pages, Sep. 31, 1999.

(Continued)

*Primary Examiner* — David Garcia Cervetti
(74) *Attorney, Agent, or Firm* — Baker Botts L.L.P.

(57) ABSTRACT

A software secure universal serial bus (USB) disk connected to a client may be redirected to a server. Requests to a virtual software secure USB disk may not be accessible because of network latency. For example, a client locking application may not verify required parameters before expiration of a time period. A client may be configured to unmount its file system (if present) and lock its disk stack. The server may load a virtual disk enumerator and file system stack to process transaction requests to the virtual software secure USB disk. The partition manager may create a partition associated with a hidden partition of the virtual software secure USB disk and associate a locking application in a separate virtual small partition. All requests to unlock the virtual hidden partition are processed at the server by the locking application instead of at the client which reduces the overall bandwidth.

20 Claims, 7 Drawing Sheets

(56) References Cited

U.S. PATENT DOCUMENTS

| | | | |
|---|---|---|---|
| 6,895,588 B1* | 5/2005 | Ruberg | H04L 29/06 709/223 |
| 7,017,162 B2* | 3/2006 | Smith | G06F 9/465 719/315 |
| 7,111,106 B2* | 9/2006 | Ohnishi | G06F 13/385 370/421 |
| 7,349,391 B2* | 3/2008 | Ben-Dor | H04L 12/40123 370/230 |
| 8,010,630 B2* | 8/2011 | Barreto | H04L 29/08846 709/219 |
| 8,266,378 B1* | 9/2012 | Jevans | G06F 12/1466 711/115 |
| 8,738,711 B2* | 5/2014 | Walsh | H04L 67/02 709/203 |
| 9,374,351 B1* | 6/2016 | Basha | H04L 63/0807 |
| 9,485,233 B1* | 11/2016 | Basha | H04L 63/08 |
| 2002/0059539 A1* | 5/2002 | Anderson | G06F 11/1096 714/6.22 |
| 2005/0066129 A1* | 3/2005 | Chang | G06F 9/4411 711/115 |
| 2006/0031547 A1 | 2/2006 | Tsui | |
| 2006/0161725 A1* | 7/2006 | Lee | G06F 3/0607 711/103 |
| 2006/0242066 A1* | 10/2006 | Jogand-Coulomb | G06F 21/10 705/50 |
| 2006/0259785 A1* | 11/2006 | Thibadeau | G06F 21/80 713/193 |
| 2007/0011446 A1* | 1/2007 | Kato | G06F 21/305 713/150 |
| 2007/0043667 A1* | 2/2007 | Qawami | G06F 21/10 705/50 |
| 2007/0050538 A1 | 3/2007 | Northcutt | |
| 2007/0061477 A1* | 3/2007 | Stoyanov | G06F 9/4411 709/230 |
| 2007/0110245 A1* | 5/2007 | Sood | H04L 9/0844 380/270 |
| 2007/0168292 A1* | 7/2007 | Jogand-Coulomb | G06F 21/6218 705/52 |
| 2008/0005414 A1 | 1/2008 | Liu | |
| 2008/0046751 A1 | 2/2008 | Choi | |
| 2008/0107262 A1* | 5/2008 | Helfman | G06F 21/62 380/44 |
| 2008/0168118 A1* | 7/2008 | Hickey | G06F 13/385 709/201 |
| 2008/0288782 A1* | 11/2008 | Iyer | G06F 21/80 713/186 |
| 2009/0150550 A1* | 6/2009 | Barreto | H04L 29/08846 709/228 |
| 2009/0150909 A1* | 6/2009 | Barreto | G06F 9/4411 719/324 |
| 2009/0204964 A1* | 8/2009 | Foley | G06F 21/53 718/1 |
| 2009/0204965 A1 | 8/2009 | Tanaka | |
| 2009/0282212 A1* | 11/2009 | Peterson | G06F 12/1433 711/173 |
| 2010/0031255 A1* | 2/2010 | Huber | G06F 8/61 718/1 |
| 2010/0083384 A1* | 4/2010 | Borchert | G06F 21/572 726/27 |
| 2010/0138652 A1* | 6/2010 | Sela | G06F 21/445 713/158 |
| 2010/0161928 A1* | 6/2010 | Sela | G06F 12/1441 711/163 |
| 2011/0131421 A1* | 6/2011 | Jogand-Coulomb | G06F 8/61 713/189 |
| 2011/0141124 A1* | 6/2011 | Halls | G06F 21/83 345/522 |
| 2011/0150436 A1* | 6/2011 | Hesselink | H04N 5/765 386/343 |
| 2011/0154023 A1 | 6/2011 | Smith | |
| 2011/0173353 A1 | 7/2011 | Bauman | |
| 2011/0202765 A1* | 8/2011 | McGrane | G06F 21/53 713/168 |
| 2011/0202916 A1* | 8/2011 | VoBa | G06F 21/62 718/1 |
| 2012/0054744 A1* | 3/2012 | Singh | G06F 21/53 718/1 |
| 2012/0131336 A1* | 5/2012 | Price | G06F 21/78 713/165 |
| 2012/0159137 A1 | 6/2012 | Khosravi | |
| 2012/0221622 A1 | 8/2012 | Raju | |
| 2012/0222124 A1 | 8/2012 | Raju | |
| 2012/0311237 A1 | 12/2012 | Park | |
| 2013/0132618 A1 | 5/2013 | de Goede | |
| 2013/0132620 A1 | 5/2013 | de Goede | |
| 2013/0132960 A1 | 5/2013 | de Goede | |
| 2014/0337558 A1 | 11/2014 | Powers | |
| 2015/0289134 A1* | 10/2015 | Johnston | H04M 1/673 380/270 |
| 2015/0358161 A1* | 12/2015 | Kancharla | H04L 63/0485 713/164 |
| 2015/0358294 A1* | 12/2015 | Kancharla | G06F 21/335 713/164 |
| 2016/0065371 A1* | 3/2016 | Vecera | G06F 12/1408 713/193 |

OTHER PUBLICATIONS

FSCTL_Lock_Volume control code by Microsoft at <<https://msdn.microsoft.com/en-us/library/windows/desktop/aa364575(v=vs.85).aspx>>, 3 pages, 2015.

FSCTL_Dismount_Volume control code by Microsoft at <<https://msdn.microsoft.com/en-us/library/windows/desktop/aa364562(v=vs.85).aspx>>, 3 pages, 2015.

* cited by examiner

SYSTEM AND METHOD TO REDIRECT AND UNLOCK SOFTWARE SECURE DISK DEVICES IN A HIGH LATENCY ENVIRONMENT

TECHNICAL FIELD

This disclosure generally relates to redirection of a software secure USB disk in a high latency environment where a locking application is executed at the server side to unlock the hidden volume of the software secure disk device.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

In universal serial bus (USB) virtualization solutions, the software secure USB disks are virtualized in the server. Read and write transactions are transferred to the software secure USB disks connected to the client over a network. In some instances, the software secure USB disk may be a software secure USB disk that includes a hidden partition. The software secure USB disk may have a partition, for example, less than 10 megabytes (MB), with a file system loaded for storing the necessary locking software to unlock the hidden partition. Another partition of the software secure USB disk contains the hidden partition.

At the server, a software security controller driver (typically provided by a vendor) will handle the hidden partition. When a successful unlock occurs, the software security controller driver handles this secure (or encrypted) hidden partition. The software security controller driver creates a virtual volume and file-system (internally) and assigns a drive-letter (for example, drive letter "E:" or drive letter "F:") so that an application may perform file level reads & writes the same as a normal disk drive. This software security controller driver converts the file reads and writes to storage (raw) reads and writes. The hidden partition is unlocked according to one or more parameters required by the locking application/software. For example, the locking application may require a password, USB mass storage device serial number (which may be read by the locking application), vendor identification and completion within a predetermined time period.

However, in high latency networks, such as a wide area network (WAN), the latency of the network may cause the transactions associated with unlocking the hidden volume to exceed the permitted predetermined time period. Several issues arise with these prior technologies. For example, a hidden partition without a volume and a file system cannot be drive-mapped. Also, vendor-provided security controllers require raw reads and writes which is not supported in drive-mapping. These USB virtualization solutions are a request and response architecture. Data is read from the virtualized USB mass storage device by making multiple read requests (including device probe requests) in that a single read request cannot read the complete data. This causes delay while the data is being accessed. In a high latency network, the delay may be increased and packet loss may occur making the virtualized USB mass storage device unusable, costly, or ineffective. For example, in a high latency network each transaction takes longer to complete or a packet is lost and needs to be retransmitted. Thus, the USB mass storage device may be unusable as the hidden volume cannot be unlocked within the predetermined time period. The present disclosure provides systems and methods for this problem.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
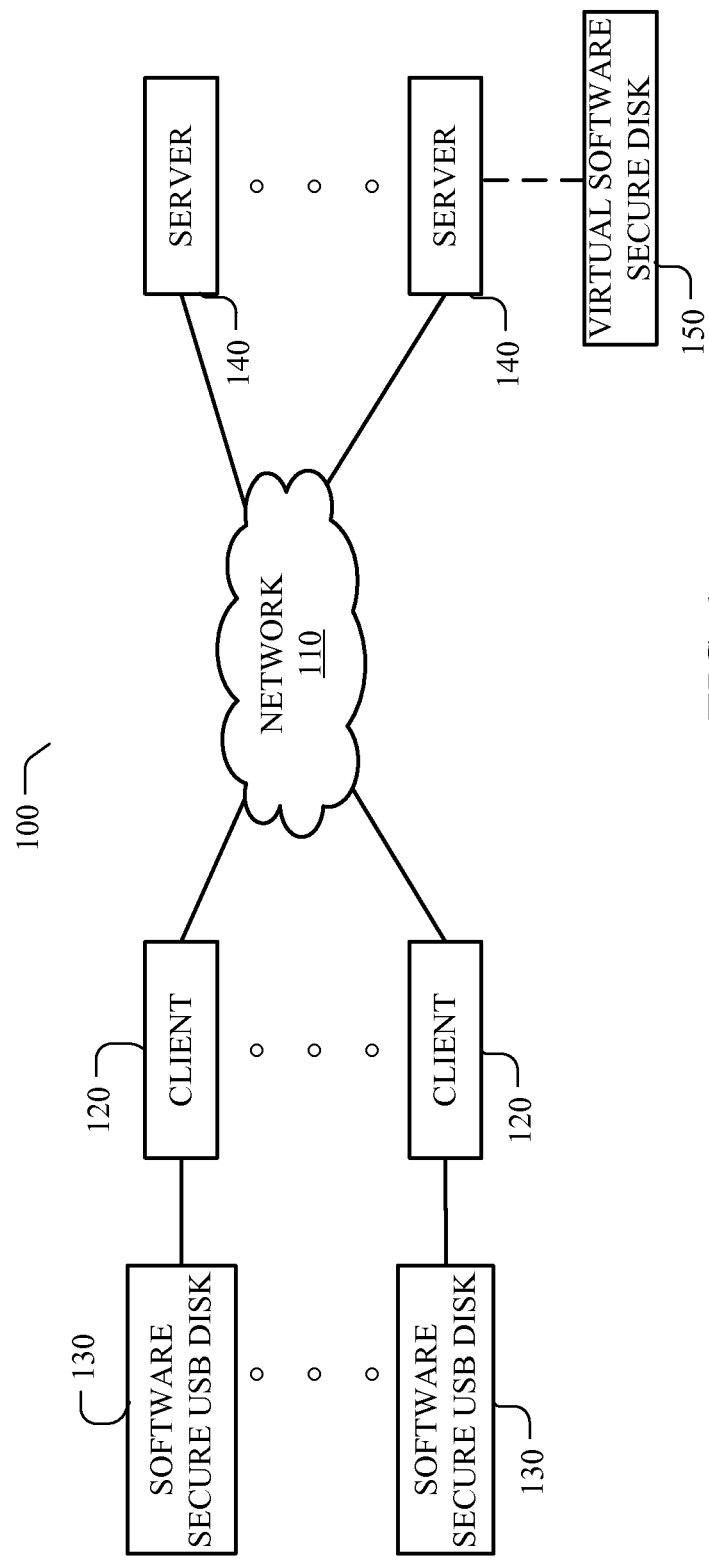
FIG. 1 illustrates an example configuration of networked information handling systems according to one embodiment of the present disclosure.

This disclosure generally relates to remote computing and, in particular, relates to virtualizing a software secure universal serial bus (USB) disk as a 'generic disk' device (virtual disk) at the server with the file system for the virtualized disk created at the server side. The proxy server via a USB virtual disk enumerator processes requests (read and write requests) to the virtual disk such that transaction burden across the network is reduced. Such is especially beneficial in a high latency network where the burden of transmitting at a minimum five transaction requests per read/write command may result in the loss of data or such delays that the virtual disk is not usable as the hidden volume cannot be unlocked within a predetermined time period. A file system is created at the server associated with the virtual disk so that the locking software for the hidden volume can be executed at the server side. The present disclosure is advantageous as it supports all types of software secure USB mass storage devices, supports raw read and write transaction (including ones requiring validation by the locking software), supports using a non-software secure USB disk as a software secure USB disk, reduces transaction requests to the client, is oblivious to the USB hub/controller type and the bus speed as the USB hub driver is present only at the client side where the USB hub driver hides and abstracts this information; supports large data transfer as USB data transfer size is dictated by the maximum transfer length of the USB endpoint or pipe which is advertised by the USB hub driver at the client side for every USB device connected to the client; provides a data transfer speed on par with network drive mapping by reducing the volume of transaction requests; requires less bandwidth compared to traditional USB mass storage device redirection because there is no USB packet overhead (for example, USB request block (URB)), the number of requests per transaction is reduced to two, and the architecture supports large data transfers; and supports disk management functions like partitioning, formatting and changing the file size which may not be available on a thin client that does not have a complete file system stack but are available at the server for the virtual disk.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a wide area network (WAN) or a local area network (LAN). In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to universal serial bus (USB) printers, scanners, USB mass storage devices, software secure USB disks and any other device known to one of ordinary skill in the art. A software secure USB disk may include USB flash drives or USB thumb drives, USB mass storage devices and any other software secure USB devices known to one of ordinary skill in the art.

As an example, if a software secure USB disk is connected to a given client via a standard USB connection, the locally connected software secure USB disk may be redirected to the server. The redirected software secure USB disk may then be installed locally for use by any number of clients. The server treats the software secure USB disk as a virtual software secure USB disk attached to the server.

FIG. 1 at 100 illustrates an example configuration of a networked information handling system. In particular embodiments, one or more client devices 120 and one or more servers 140 are connected via network 110. Many types of peripheral devices may be connected locally to the client devices 120. As shown in FIG. 1, in some embodiments, one or more software secure USB disks 130 connect to the client devices 120. According to the present disclosure, one or more software secure USB disks 130 may appear to one or more of servers 140 as if they are locally installed on and connected to those servers 140. In certain embodiments, these software secure USB disks 130 may be redirected such that they appear to be locally installed or locally shared with another client device 120. In one embodiment, the Dell Wyse TCX USB Virtualization is used to virtualize the software secure USB disks 130. In one or more embodiments, one or more software secure USB disks 130 may be virtualized as a 'generic disk' device (a virtual software secure USB disk 150) at a server 140. In one or more embodiments, the software secure USB disks 130 may be a software secure USB mass storage device that includes a hidden volume.

Figure 2:
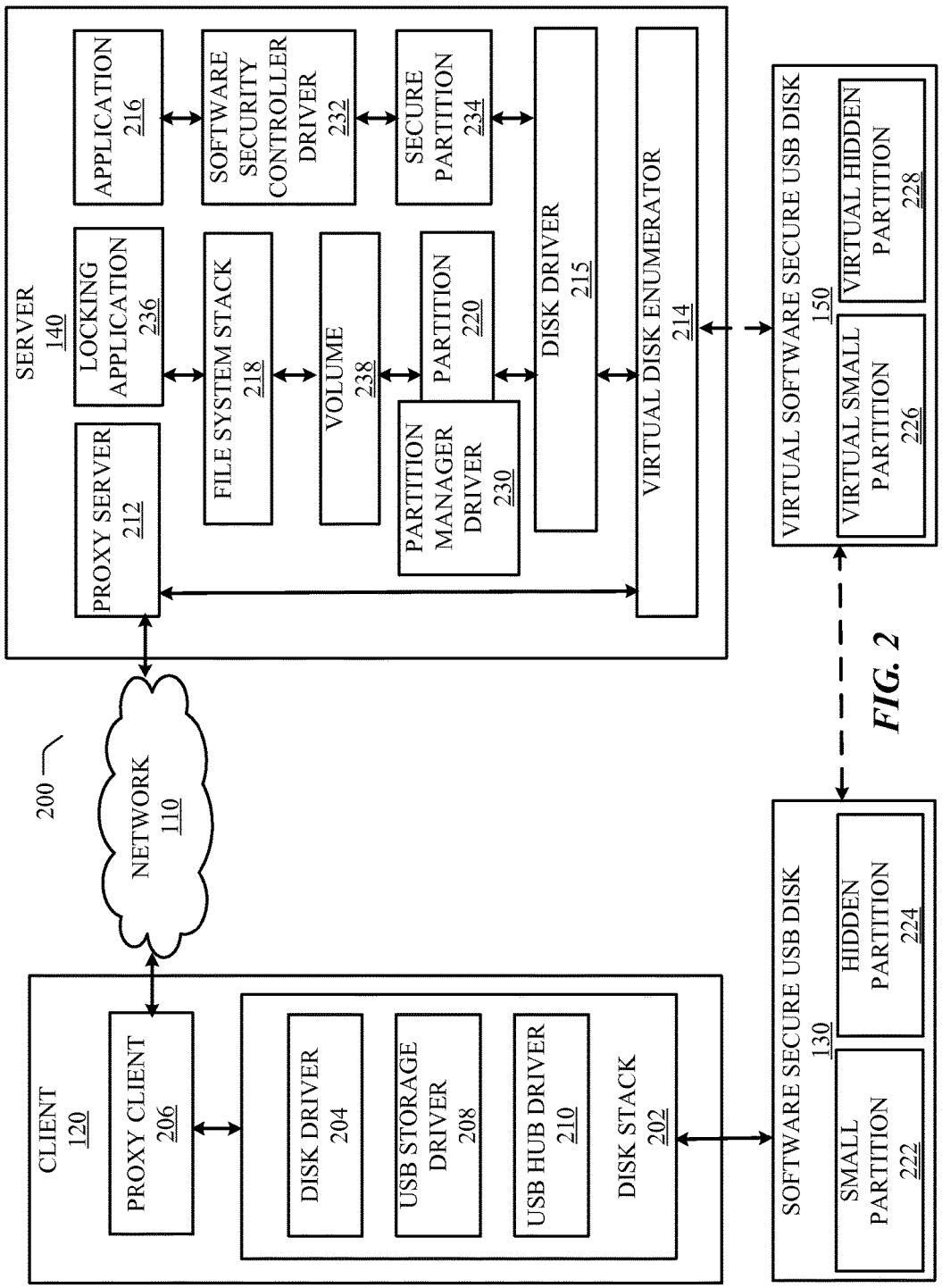
FIG. 2 illustrates an example system of a networked client and server according to one embodiment of the present disclosure.

FIG. 2 at 200 illustrates an example embodiment of a system configured to redirect a software secure USB disk 130, for example, a USB hard disk drive. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

Client 120 includes a disk stack 202. Disk stack 202 includes a disk driver 204, a USB storage driver 208 and a USB hub driver 210. The disk driver 204 manages the software secure USB disk 130 and converts any generic read and write requests to the appropriate storage request. The disk driver 204 receives via proxy client 206 any data from one or more applications 216 directed to the virtual disk 150. The data passes through the USB storage driver 208 and then to the USB hub driver 210 where the USB hub driver 210 breaks the data into multiple data transfers for transmission to the software secure USB disk 130.

Software secure USB disk 130 may include a small partition 222 and a hidden partition 224. The small partition 222 may have a file system loaded to have software that unlocks the hidden partition 224. The small partition 222 is generally smaller in size than the hidden partition 224. In one embodiment, the small partition 222 is less than 10 megabytes (MB). The software to unlock the hidden partition 224 may be referred to as a "locking application" or "locking software." The hidden partition 224 does not include a file system and thus file reads and writes are prohibited.

Client 120 recognizes software secure USB disk 130, which is connected locally. The client 120 loads the USB storage driver 208. The USB storage driver 208 manages the software secure USB disk 130 and converts any generic read and write requests to the appropriate request or URB. The USB storage driver 208 loads the disk driver 204. The USB hub driver 210 primarily manages the USB hubs and corresponding ports and enumerates any USB devices connected to these ports. Client 120 may be configured to automatically install all or only certain USB devices, such as only certain software secure USB disks 130, locally, may be configured to automatically redirect all or certain software secure USB disks 130 to server 140, or may be configured to request input from a user of client 120 or from another source to determine whether to install a particular software secure USB disk 130 or interface locally or to redirect it.

If a software secure USB disk 130 is configured to be redirected to server 140, the redirection may operate generally as described in U.S. Pat. No. 8,010,630 to Barreto, et al., which is incorporated herein by reference. In particular embodiments, client 120 connects to server 140 via network 110. Network 110 may be a high latency network. A proxy client 206 on client 120 may coordinate communications with software secure USB disk 130 and the proxy server 212 of server 140. In particular, proxy client 206 may be configured to receive socket connection information from proxy server 212 of server 140 and initiate redirecting device transactions to and software secure USB disk 130 to proxy server 212 on server 140.

USB mass storage devices, such as software secure USB disk 130, adhere, in general, to the USB mass storage bulk only transport (BOT) specification/protocol. Per the BOT protocol, every read/write request must sequence through the following transactions: 1) Command Block Wrapper (CBW) transfer [command]; 2) CBW completion; 3) data transfer; 4) Command Status Wrapper (CSW) request [get status]; 5) CSW completion [data transfer status]. At a minimum, generally every software secure USB disk 130 read/write requires executing five transactions. The data transfer size will be limited to the software secure USB disk's 130 maximum transfer size.

Figure 7:
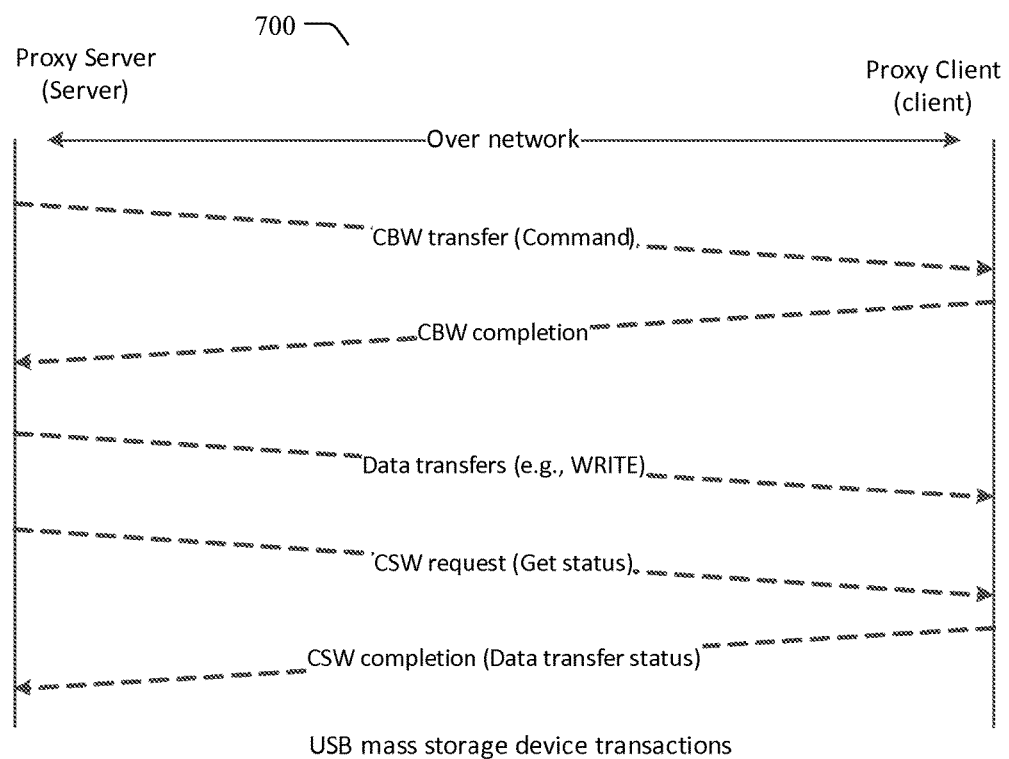
FIG. 7 illustrates transaction requests between a client and server for a typical virtualization environment.

These transactions to/from the client 120 to/from the server 140 are illustrated in FIG. 7. The five types of transaction are depicted. In general, for each read and write the back and forth between the proxy server 212 and proxy client 206 must occur. In a high latency network this minimum number of transactions may take a long period of time to complete and packet loss may result. If packets are lost, the transaction requests will need to be retried increasing the delay even more. Such a delay may make the software secure USB disk 130 unusable or too costly. Further such a delay may prevent the unlocking of a hidden volume of the software secure USB disk 130 as the latency of the network will prevent the required parameters from being transmitted with a predetermined time period required by the locking application associated with the hidden volume.

To solve this latency/predetermined time period problem, the software secure USB disk 130 is virtualized as a 'generic disk' device, virtual software secure USB disk 150 at server 140. The virtual software secure USB disk 150 will include a virtual small partition 226 corresponding to small partition 222 and a virtual hidden (secure) partition 228 corresponding to hidden partition 224. The virtual hidden partition 228 is a secure partition that requires an encryption key before any read/write requests may be processed. Thus, the virtual hidden partition 228 may not be accessed without a proper encryption key. Secure partition 234 is associated with virtual hidden partition 228. The secure partition 234 is also managed by the partition manager driver 230, for example, so as to convert partition (relative) offsets for read/write requests to actual disk offsets.

The proxy server 212 of server 140 loads the virtual disk enumerator 214. The partition 220 associated with virtual small partition 226 of the server 140 is loaded and the OS loads on top the file system stack 218 if the virtual software secure USB disk 150 is already formatted with a file system, The file system stack 218 permits application 216 to store to and retrieve files from the virtual USB disk 150. The partition 220 only permits raw reads and writes, for example, sector information, of the virtual software secure USB disk 150. For file level access the small partition 222 of the software secure USB disk 130 must be formatted with a file system. Correspondingly, file system stack 218 is required and associated with the partition 220. The virtual software secure USB disk 150 must format the virtual small partition 222 with a file system associated with the file system stack 218 (for example, new technology file system (NTFS), file allocation table (FAT), FAT32, ex-FAT). For example, the server 140, in one embodiment, may partition, format or change the file system of the virtual software secure USB disk 150. A partition manager driver 230 manages the partition 220, for example, so as to convert partition (relative) offsets for read/write requests to actual disk offsets. Partition 220 remains unlocked in that it can accept read/write requests at any time. Partition 220 may contain the locking application 236. Partition 220 handles all requests to the virtual software secure USB disk 150 that do not require an encryption key or requests directed to the virtual small partition 226.

The software security controller driver 232 uses an encryption key received from the locking application 236 to obtain access to the virtual hidden partition 228. By using the encryption key created by the locking application 236, the security controller driver 232 via the secure partition 234 may transmit read/write requests to the virtual hidden partition 228.

Volume 238 is a next level of abstraction for the virtual small partition 226. Volume 238 helps the file system stack 218 (layered above) to work seamlessly with virtual small partition 226 and virtual software secure USB disk 150. The volume 238, a virtual volume, passes requests to the partition 220. In addition, the partition 220 translates requests to a form or appropriate request understood by the disk driver 215 which sends the appropriate requests to the virtual small partition 226 via virtual disk enumerator 214. For example, the partition 220 handles the file reads/writes and converts these file reads/writes to storage/raw reads/writes with proper disk offset(s) that do not require access to the virtual hidden partition 228. To access the virtual hidden partition 228 (the encrypted partition), the software security controller driver 232 performs the function of the volume 238 and file system stack 218 and creates the drive-letter for the virtual hidden partition 228 for application 216 to access. When the application 216 attempts to access the virtual hidden partition 228, the software security controller driver 232 converts the file read/write request from the application 216 to a storage read/write request and posts it to secure partition 234. In addition, the software security controller driver 232 handles the encryption while reading/writing data to/from the virtual hidden partition 228 via disk driver 215 and virtual disk enumerator 214.

Once the virtual software secure USB disk 150 is created by the virtual disk enumerator 214, application 216 may be able to access the virtual software secure USB disk 150 with the partition 220 and the file system stack 218 (both associated with the virtual software secure USB disk 150) which may process these requests by converting them to the appropriate storage read/write request. The virtual software secure USB disk 150 is managed by the disk driver 215. If the request to access the virtual software secure USB disk 150 is made to a partition that is hidden, such as virtual hidden partition 228, the locking application 236 may be executed to unlock the virtual hidden partition 228 at the server 140. Application 216 may be one or more applications and may be one or more virtual applications. The overhead associated with a read/write request from an application 216 is handled by the virtual disk driver 220 and file system stack 218 reducing the number of read/write transactions that must be sent to the client 120. The virtual disk enumerator 214 transmits the storage read/write requests to the proxy server 212. Proxy server 212 then transmits the read/write requests to the proxy client 206. Proxy client 206 communicates with the USB mass storage device 130 via the disk stack 202. The operation of the elements of FIG. 2 is further described below with respect to FIG. 3 and FIG. 4.

The application 216 may make requests to access one or more virtual software secure USB disks 150. These requests may require at a minimum the five transactions as illustrated in FIG. 7. In one embodiment of the present invention, the server 140 handles all the overhead associated with a request to access one or more virtual software secure USB disk 150 as further described with respect to FIG. 5.

Figure 3:
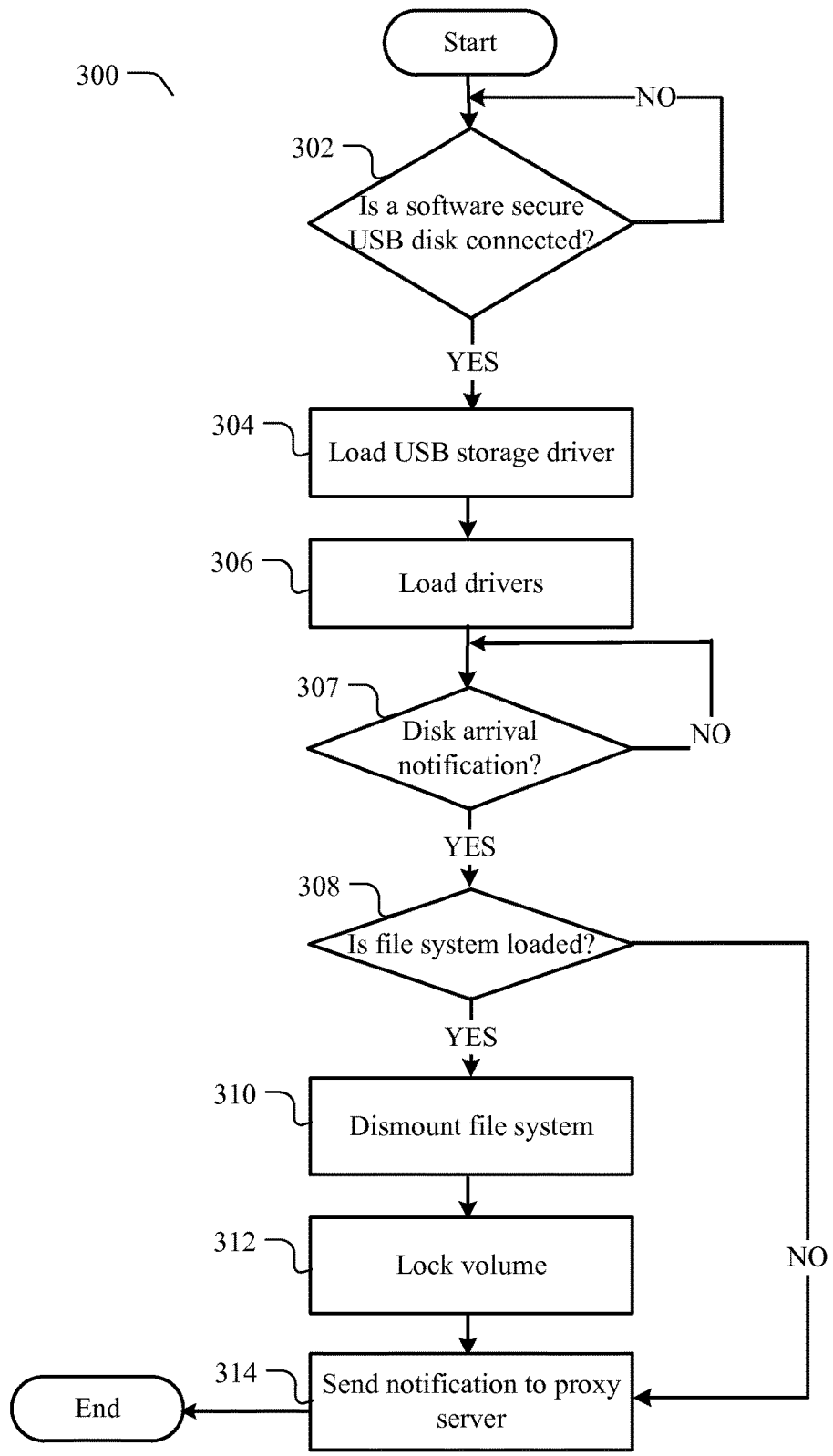
FIG. 3 illustrates an example of steps involved in one method according to one embodiment of the present disclosure.

FIG. 3 is a flow chart in accordance with an embodiment of the present disclosure, shown generally at 300, relating to preparation of the client 120 for redirection of a software secure USB disk 130 such that a locking application 236 unlocks the access to the virtual software secure USB disk 150 at the server 140 to expose the virtual hidden partition 228.

At step 302, the client 120, via proxy client 206, polls to determine if a software secure USB disk 130 is connected to client 120. Proxy client 206 may determine if a software secure USB disk 130 is connected by any process known to one of ordinary skill in the art. For example, in one embodiment a user may use a graphical user interface (GUI) to inform the client 120 that a software secure USB disk 130 has been connected. In another embodiment, the client 120 may automatically detect without user intervention the connection of a software secure USB disk 130. Software secure USB disk 130 may be any known mass storage device including, but not limited to, a USB thumb drive, a USB hard disk drive or any other USB storage device known to one of ordinary skill in the art that can be coupled to the client 120 via a USB. Client 120 may poll for a connection in any way known to one of ordinary skill in the art, including, but not limited, waiting on an interrupt, timer, semaphore, etc. that indicates connection of a USB device such as software secure USB disk 130.

If a software secure USB disk 130 is connected to the client 120, then at step 304, the client 120, via proxy client 206, loads a USB storage driver 208 associated with the software secure USB disk 130. At step 306, the USB mass storage device driver 208 loads an associated disk driver 204. A USB hub driver 210 is also loaded and together the disk driver 204, USB storage driver 208 and USB hub driver 210 form a disk stack 202. At step 307, the proxy client 206 waits for the disk arrival notification from the OS of the client 120. In one embodiment the process continues to loop at step 307 until a disk arrival notification is received. In another embodiment, the process may send an error notification if a disk notification is not received within a predetermined time period. In another embodiment, the process may end without sending an error notification if a disk arrival notification is not received with a predetermined time period. The disk arrival notification instructs the software secure USB disk 130 that the software secure USB disk 130 has been properly loaded and is accessible.

The proxy client 206 registers with the server 140 for device arrival notification of the type associated with the software secure USB disk 130. Once the software secure USB disk 130 is connected to the client 120, the OS of the client 120 will notify the proxy client 206 with the device type information. The proxy client 206 based, at least in part, on this information will lock the software secure USB disk 130.

If a disk arrival notification is received, then at step 308, the client 120, via proxy client 206, determines if the file system is loaded. If loaded, the file system will be on top of the disk stack 202 (for example, above the disk driver 204). However, the present solution works only when the file system is dismounted, and thus the file system is not shown in the client 120 of FIG. 2. If the file system is not loaded, then the process continues at step 314 without loading any file system. In general, if a file system is loaded, a raw write (for example, write operation bypassing the mounted file-system) operation to a software secure USB disk 130 is prohibited. In one embodiment of the present invention, this type of raw write must occur so that multiple transactions are not executed for every read/write request to the software secure USB disk 130. Thus, if the file system is loaded, at step 310, the file system is dismounted. The file system may be dismounted issuing a command, such as FSCTL_DISMOUNT_VOLUME. This will ensure that the read/write requests from the server 140 are serviced properly at the client 120.

At step 312 the volume is locked. The volume may be locked by issuing a command, such as FSCTL_LOCK_VOLUME. Locking the volume includes locking the disk stack 202. This prevents any application, such as application 216, from accessing the software secure USB disk 130 except through the proxy client 206. At step 314, the proxy client 206 sends a notification, such as a plug-in notification, to the proxy server 212 that a software secure USB disk 130 is prepared for virtualization at the server 140. The notification may contain one or more disk properties including, but not limited to, sector size, disk size, vendor identification, product identification, serial number, and any other disk property known to one of ordinary skill in the art.

Figure 4:
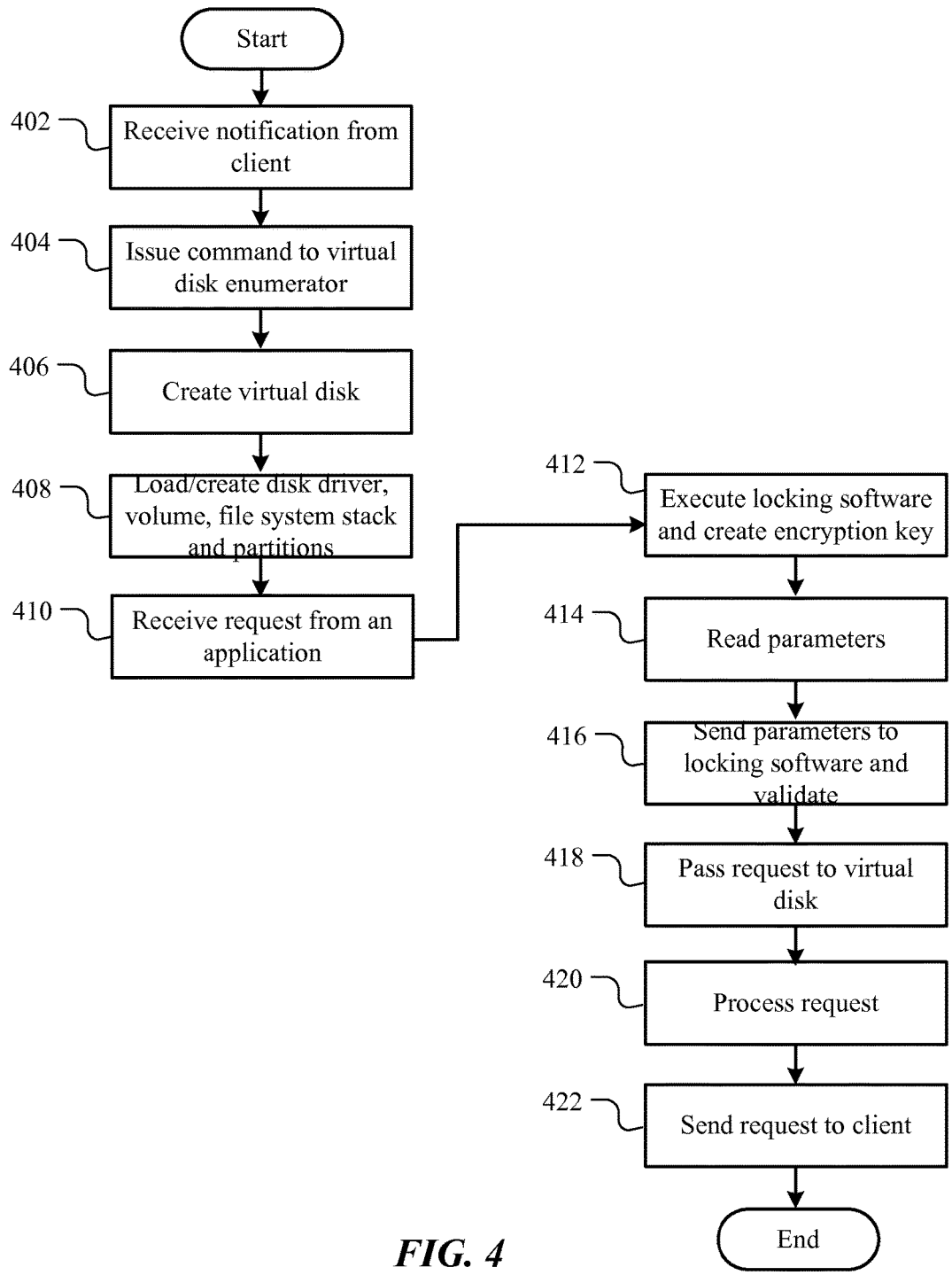
FIG. 4 illustrates an example of steps involved in one method according to one embodiment of the present disclosure.

FIG. 4 is a flow chart in accordance with one embodiment of the present invention shown generally at 400. At step 402, the server 140 receives a disk arrival notification from the client 120 that a software secure USB disk 130 is ready for virtualization such that it can be accessed from one or more applications 216. The disk arrival notification may include one or more parameters. The notification is sent from the proxy client 206 to the proxy server 212. At step 404, the proxy server 212 issues a command to the virtual disk enumerator 214 to create the virtual disk 150. The command may be an input/output control (IOCTL) command or any other such command known to one of ordinary skill in the art. The virtual disk enumerator 214 at step 406 creates the virtual software secure USB disk 150 based, at least in part, on any one or more parameters, also known as disk properties, associated with the notification.

At step 408, the disk driver 215, volume 238 and the file system stack 218 are loaded by the OS based, at least in part, on one or more received parameters of the software secure USB disk 130. The virtual small hidden partition 226 and the virtual hidden partition 228 are also created by the virtual disk enumerator 214. Partition 220 associated with the virtual small hidden partition 226 is loaded by the OS. The virtual hidden partition 228 (the secure partition) may not have any volume and/or file system loaded such that file level reads and writes are not permitted by any application 216. Once step 408 is complete, at step 410 a request is received by one or more applications 216. The request is received by the virtual software secure USB disk 150 via the virtual disk enumerator 214.

At step 412, the locking application 236 is executed at the server 140. The locking application 236 creates the encryption key based, at least in part, on one or more of the received parameters. For example, in one embodiment, the encryption key is based, at least in part, on a serial number, vendor identification, and/or product identification. Locking application 236 associated with the software secure USB disk 130 may be received by the client 120 before creating the virtual software secure USB disk 150. In another embodiment, the server 140 creates the virtual software secure USB disk 150 as a software secure device such that locking application 236 is required to be executed before access to virtual hidden partition 228 of the virtual software secure USB disk 150. In this embodiment, the server 140 creates a volume 238 of the virtual software secure USB disk 150 so that when the server 140 loads a file system stack 218 associated with the virtual software secure USB disk 150 complete file level access commands are available to the server 140 for the virtual software secure USB disk 150. The locking application 236 in one embodiment may be provided by the server. The virtual small partition 226 associated with the locking application 236 is generally less than 10 MB.

In one embodiment, step 410 need not occur prior to step 412. That is, the virtual hidden partition 228 of virtual software secure USB disk 150 may be unlocked prior to receiving any request by an application 216. In another embodiment, each time a request is received from an application 216, the virtual hidden partition 228 must be unlocked such that for each request from an application 216 steps 412-416 must be performed. In another embodiment, once a request from an application 216 for virtual software secure USB disk 150 is received, steps 412-416 are executed and the virtual hidden partition 228 remains unlocked until a request is received to lock the virtual hidden partition 228.

At step 414, one or more parameters are read from the virtual software secure USB disk 150. The one or more parameters may be received with the disk arrival notification. The one or more parameters may include one or more of a password, vendor identification, product identification, and a serial number of the software secure USB disk 130, information stored in a reserved sector of the software secure USB disk 130, or any other parameter known to one of ordinary skill in the art. In one embodiment, the serial number of the software secure USB disk 130 is one of the one or more properties received by the server 140 from the client 120 during creation of the virtual disk 150. The serial number (or any one or more of the one or more received parameters) may be stored internally by the virtual disk enumerator 214.

Once all the required parameters are read, at step 416 the parameters are sent to the locking application 236 whereupon the locking application 236 validates the parameters before unlocking the virtual hidden partition 228. The locking application 236 may send a request to the software secure USB disk 130 via proxy server 212 and proxy client 206 for security information stored in reserved or well-known sectors that is necessary to unlock any hidden partition, such as virtual hidden partition 228 associated with hidden partition 224. The disk stack 202 will service this request. The request for this security information may be performed at any time. The locking application 236 creates an encryption key based, at least in part, on the security information and one or more of the received parameters. For example, in one embodiment, the received parameters include a serial number, vendor identification, product identification, and a password.

The locking application 236 may require that the parameters and/or the security information be sent within a predetermined time period or access is denied. For example, the locking application 236 may require that the correct parameters be received by the locking application 236 within two seconds or three seconds. The predetermined time period may be a setting included as part of the locking application 236. In one embodiment, the setting may be configurable by an administrator such that the predetermined time period may be increased or decreased. In another embodiment, the predetermined time period is fixed by the manufacturer of the locking application 236. In another embodiment, the setting itself may require a password and any of one or more parameters before the setting may be altered.

The locking application 236 transmits the encryption key to the software security controller driver 232. The software security controller driver 232 uses the encryption key to transmit read/write requests to the virtual hidden partition 228 (the secure or encrypted partition). In this way, all transactions related to unlocking the virtual hidden partition 228 are handled at the server 140 as opposed to transmitting all the transactions to the client 120 for processing.

At step 418, if the parameters are correct and the locking application 236 unlocks the virtual software secure USB disk 150, the request is passed to the virtual software secure USB disk 150 as discussed above with respect to FIG. 2. That is, the software security controller driver 232 handles any encryption/decryption associated with the request and passes the request to the disk driver 215 via secure partition 234.

At step 420 the request is processed. The transaction requests received by the virtual disk enumerator 214 are either read requests or write requests. If the file system stack 218 is loaded, the file read/write requests for virtual small partition 226 are converted to storage read/write requests by file system stack 218. File read/write requests for virtual hidden partition 228 will be converted to storage read/write requests by the software security controller driver 232. The overhead associated with the transaction request from an application 216 is handled by the secure partition 234 and file system stack 218 reducing the number of read/write transactions that must be sent to the client 120. For example, in one embodiment the transaction request is a write request. Once the virtual hidden partition 228 is unlocked, the software security controller driver 232 handles the file read/write requests to the virtual hidden partition 228. All other operations are the same as for any generic USB disk.

Figure 5:
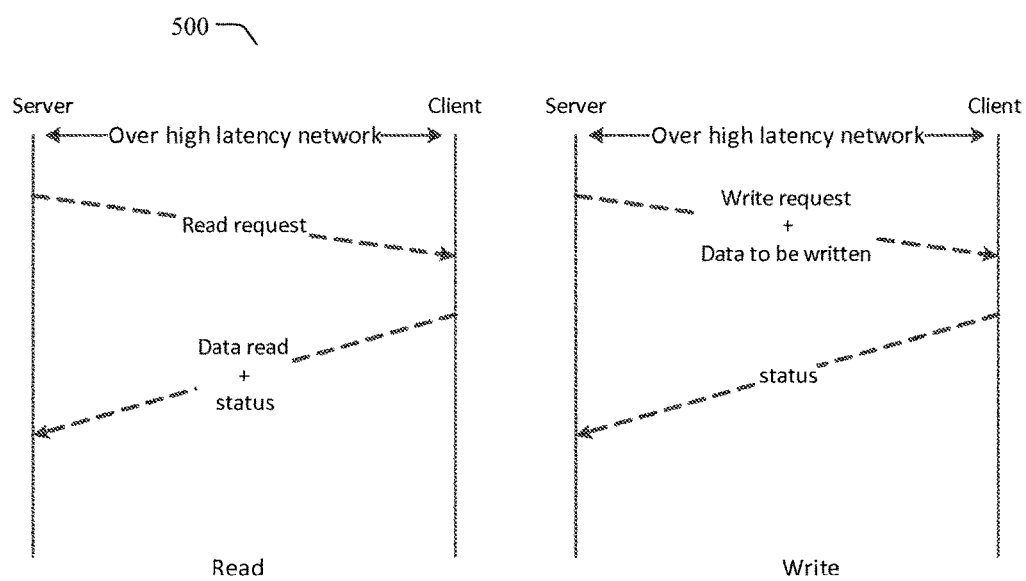
FIG. 5 illustrates transaction requests between a client and server according to one embodiment of the present disclosure.

Only the write command along with the associated data is transmitted to the client 120 and only the status is received back from the client 120 as illustrated in FIG. 5. The CBW transfer, CBW completion, and CSW request as illustrated in FIG. 7 are not necessary as the disk driver 215 and file system stack 218 have handled these overhead transactions. Similarly in another embodiment the transaction request is a read request. Only the read command is transmitted to the client 120 with the client 120 returning only the data requested and the status as illustrated in FIG. 5. The CBW transfer, CBW completion and CSW request as illustrated in FIG. 7 are not necessary as the disk driver 215 and file system stack 218 have handled these overhead transactions.

At step 422, the virtual disk enumerator 214 transmits the transaction request (read/write) via the proxy server 212 to the proxy client 206 which posts the transaction request to the disk stack 202 at the client 120. As shown generally at 500 of FIG. 5, according to one embodiment of the present disclosure, only the read request for the virtual software secure USB disk 150 is sent from the server 140 to the client 120 which responds back to the server 140 with the data requested from the software secure USB disk 130 along with the status of the software secure USB disk 130. Likewise, according to one embodiment of the present disclosure, a write request along with the data to be written is for the virtual disk 150 is sent from the server 140 to the client 120 which responds back to the server 140 with the status of the software secure USB disk 130. Thus, only two transaction requests need be executed as compared to the at least five transaction requests required by traditional systems.

If a software secure USB disk 130 is disconnected, the OS may send a disk removal notification to the proxy client 206 and the server 140 will stop servicing any new I/O requests. The OS of the server 140, after receiving notification from the proxy server 212, will unload the file system stack 218, volume 238, partition 220, software security controller driver 232, secure partition 234, and disk driver 215.

Figure 6:
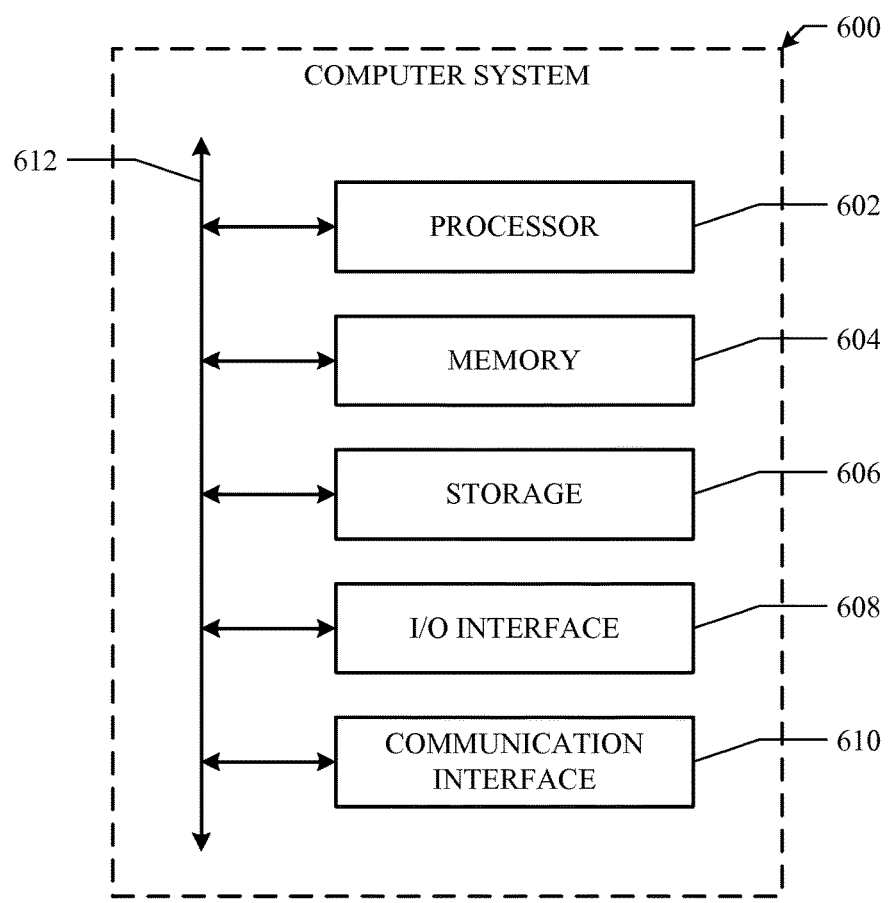
FIG. 6 illustrates an example computing system according to one embodiment of the present disclosure.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a HDD, a floppy disk drive, flash memory, an optical disc, a magneto-optical disc, magnetic tape, or a USB drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a LAN, a WAN, a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at a server, a disk arrival notification that a software secure universal serial bus (USB) disk has been coupled to a client;
issuing a command by a proxy server of the server to a virtual disk enumerator to create a virtual software secure USB disk associated with the software secure USB disk;
loading a disk driver corresponding to the virtual software secure USB disk;
loading a file system stack corresponding to the virtual software secure USB disk, wherein the file system stack provides file level access of the virtual software secure USB disk;
creating a virtual hidden partition of the virtual software secure USB disk, wherein the virtual hidden partition is associated with a hidden partition of the software secure USB disk, and wherein access to the virtual hidden partition requires an encryption key;
creating a virtual small partition of the virtual software secure USB disk, wherein the virtual small partition is associated with a small partition of the software secure USB disk;
creating a partition, wherein the partition is associated with the virtual small partition;
creating by a locking application the encryption key;
unlocking the virtual hidden partition at the server by the locking application; and
transmitting a request to the virtual hidden partition.

2. The method of claim 1 further comprising:
managing the virtual software secure USB disk by the disk driver.

3. The method of claim 1 further comprising:
receiving by the locking application one or more parameters associated with the virtual software secure USB disk; and
validating the one or more parameters within a predetermined time period.

4. The method of claim 1, further comprising:
posting by a software security controller driver the request to a secure partition, wherein the secure partition communicates the request to the virtual hidden partition.

5. The method of claim 4, wherein the software security controller driver uses the encryption key to obtain access to the virtual hidden partition.

6. The method of claim 4, wherein the secure partition is managed by a partition manager driver.

7. The method of claim 4, further comprising:
encrypting the virtual hidden partition by the software security controller driver.

8. A system comprising:
a server;
one or more central processing units for processing information of the first server;
a memory of the server communicatively coupled to the one or more central processing units; and
one or more modules that comprise instructions stored in the memory, the instructions, when executed by the one or more processing units, operable to perform operations comprising:
receiving, at the server, a disk arrival notification that a software secure universal serial bus (USB) disk has been coupled to a client;
issuing a command by a proxy server of the server to a virtual disk enumerator to create a virtual software secure USB disk associated with the software secure USB disk;
loading a disk driver corresponding to the virtual software secure USB disk;
loading a file system stack corresponding to the virtual software secure USB disk, wherein the file system stack provides file level access of the virtual software secure USB disk;
creating a virtual hidden partition of the virtual software secure USB disk, wherein the virtual hidden partition is associated with a hidden partition of the software secure USB disk, and wherein access to the virtual hidden partition requires an encryption key;
creating a virtual small partition of the virtual software secure USB disk, wherein the virtual small partition is associated with a small partition of the software secure USB disk;
creating a partition, wherein the partition is associated with the virtual small partition;
creating by a locking application the encryption key;
unlocking the virtual hidden partition at the server by the locking application; and
transmitting a request to the virtual hidden partition.

9. The system of claim 8, wherein the instructions further operable to perform operations comprising:
managing the virtual software secure USB disk by the disk driver.

10. The system of claim 8, wherein the instructions further operable to perform operations comprising:
receiving by the locking application one or more parameters associated with the virtual software secure USB disk; and
validating the one or more parameters within a predetermined time period.

11. The system of claim 8, wherein the instructions further operable to perform operations comprising:
posting by a software security controller driver the request to a secure partition, wherein the secure partition communicates the request to the virtual hidden partition.

12. The system of claim 11, wherein the software security controller driver uses the encryption key to obtain access to the virtual hidden partition.

13. The system of claim 11, wherein the secure partition is managed by a partition manager driver.

14. The system of claim 11, wherein the instructions further operable to perform operations comprising:
encrypting the virtual hidden partition by the software security controller driver.

15. One or more computer-readable non-transitory storage media embodying software operable when executed by one or more computer systems to:
receive, at a server, a disk arrival notification that a software secure universal serial bus (USB) disk has been coupled to a client;
issue a command by a proxy server of the server to a virtual disk enumerator to create a virtual software secure USB disk associated with the software secure USB disk;
load a disk driver corresponding to the virtual software secure USB disk;
load a file system stack corresponding to the virtual software secure USB disk, wherein the file system stack provides file level access of the virtual software secure USB disk;

create a virtual hidden partition of the virtual software secure USB disk, wherein the virtual hidden partition is associated with a hidden partition of the software secure USB disk, and wherein access to the virtual hidden partition requires an encryption key;

create a virtual small partition of the virtual software secure USB disk, wherein the virtual small partition is associated with a small partition of the software secure USB disk;

create a partition, wherein the partition is associated with the virtual small partition;

create by a locking application the encryption key;

unlock the virtual hidden partition at the server by the locking application; and transmit a request to the virtual hidden partition.

16. The media of claim 15, wherein the software is further operable when executed to:
manage the virtual software secure USB disk by the disk driver.

17. The media of claim 15, wherein the software is further operable when executed to:
post by a software security controller driver the request to a secure partition, wherein the secure partition communicates the request to the virtual hidden partition.

18. The media of claim 17, wherein the software security controller driver uses the encryption key to obtain access to the virtual hidden partition.

19. The media of claim 17, wherein the secure partition is managed by a partition manager driver.

20. The media of claim 17, wherein the software is further operable when executed to:
encrypt the virtual hidden partition by the software security controller driver.

* * * * *